United States Patent
Wang et al.

(10) Patent No.: US 7,450,336 B1
(45) Date of Patent: Nov. 11, 2008

(54) METHOD FOR IMPROVED REPEATABLE RUN OUT LEARNING IN A DISK DRIVE

(75) Inventors: Zhi Wang, Irvine, CA (US); Jianghong Ding, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 134 days.

(21) Appl. No.: 11/590,577

(22) Filed: Oct. 31, 2006

(51) Int. Cl.
*G11B 5/596* (2006.01)
*G11B 21/02* (2006.01)

(52) U.S. Cl. .................. 360/77.04; 360/75; 360/77.08; 360/78.04

(58) Field of Classification Search ........................ None
See application file for complete search history.

(56) References Cited

U.S. PATENT DOCUMENTS

| | | | |
|---|---|---|---|
| 5,550,685 A | 8/1996 | Drouin | |
| 5,585,976 A | 12/1996 | Pham | |
| 5,793,559 A | 8/1998 | Shepherd et al. | |
| 5,825,578 A | 10/1998 | Shrinkle et al. | |
| 5,920,441 A | 7/1999 | Cunningham et al. | |
| 6,049,440 A | 4/2000 | Shu | |
| 6,097,565 A | 8/2000 | Sri-Jayantha et al. | |
| 6,141,175 A | 10/2000 | Nazarian et al. | |
| 6,310,742 B1 | 10/2001 | Nazarian et al. | |
| 6,545,835 B1 | 4/2003 | Codilian et al. | |
| 6,654,198 B2 | 11/2003 | Liu et al. | |
| 6,661,599 B1 | 12/2003 | Chen et al. | |
| 6,738,205 B1 | 5/2004 | Moran et al. | |
| 6,765,747 B1 * | 7/2004 | Sun et al. .................. 360/77.04 |
| 6,847,503 B2 | 1/2005 | Zhang et al. | |
| 6,952,320 B1 | 10/2005 | Pollock et al. | |
| 6,999,267 B1 | 2/2006 | Melkote et al. | |
| 2004/0160696 A1 | 8/2004 | Meyer | |
| 2004/0246619 A1 | 12/2004 | Zhang | |
| 2005/0231842 A1 | 10/2005 | Pang et al. | |

* cited by examiner

Primary Examiner—Andrew L. Sniezek
(74) Attorney, Agent, or Firm—Robroy Fawcett, Esq.

(57) ABSTRACT

A method is disclosed for determining fundamental-frequency repeatable runout (1FRRO) coefficients in a disk drive. The disk drive includes a transducer head, a rotating magnetic disk having a plurality of concentric data tracks defined by embedded servo wedges that provide position information, and an actuator coupled to the head. In the method, the head is caused to move in a substantially constant velocity motion across a selected portion of the tracks of the rotating magnetic disk in response to a control signal. The position information is read from the embedded servo wedges as the head moves across of the selected portion of the tracks. The 1FRRO coefficients are determined based on the position information read as the head moved in a substantially constant velocity motion across the selected portion of the tracks.

28 Claims, 6 Drawing Sheets

IDEAL SERVO TRACKS

FIG. 7B
(Prior Art)

WRITTEN SERVO TRACKS

METHOD FOR IMPROVED REPEATABLE RUN OUT LEARNING IN A DISK DRIVE

BACKGROUND OF THE INVENTION

1. Field of the Invention

The present invention relates to disk drives for computer systems. More particularly, the present invention relates to techniques for efficiently determining repeatable runout (RRO) in a disk drive.

2. Description of the Prior Art

Figure 7A:
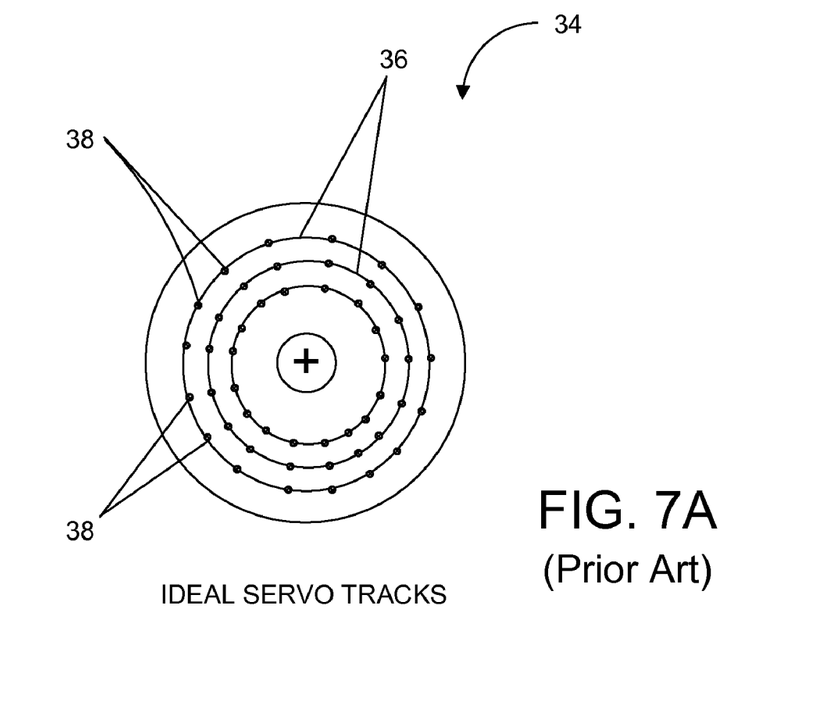
FIG. 7A is a schematic diagram illustrating ideal servo tracks on a disk of a disk drive.
Figure 7B:
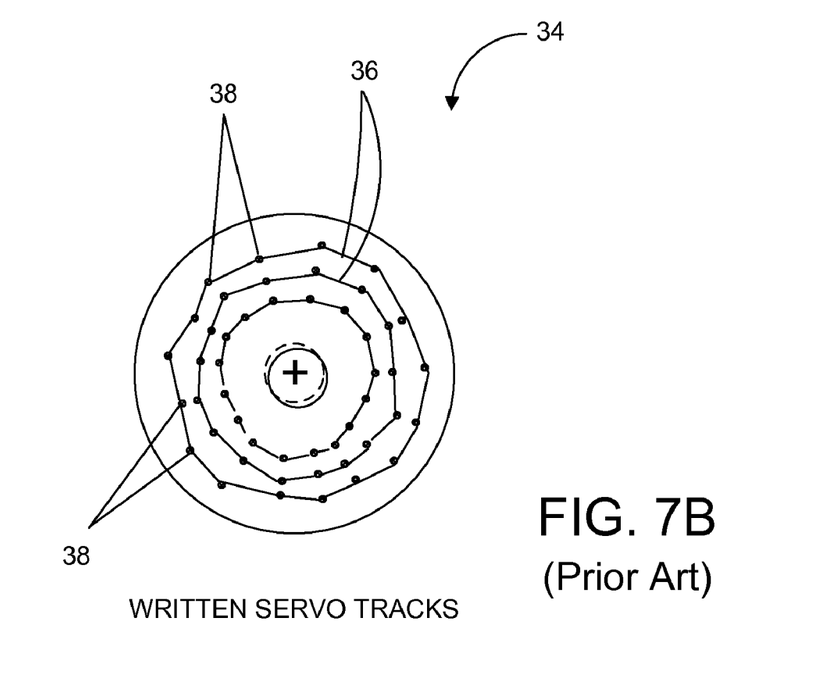
FIG. 7B is a schematic diagram illustrating a disk having written servo tracks exhibiting RRO.

With reference to FIGS. 7A and 7B, repeatable runout (RRO) in a disk drive is a disturbance in the servo system which can degrade performance by disrupting the head's centerline tracking during read and write operations. The RRO disturbance, compared with a perfectly centered and circular data track, is typically caused by physical imperfections in the disk drive such as spindle motor runout, disk slippage, disk warping, media defects, and imperfections in the electromechanical servoing mechanism including the mechanism for writing embedded servo sectors onto the disk during manufacturing. Because the imperfections that cause RRO are relatively static, RRO is a predictable disturbance that is periodic with the rotation of the disk. It is known in the industry to estimate and cancel out the periodic RRO disturbance by introducing a feed-forward compensation signal into the servo loop.

The RRO disturbance due to the disk having a non-centric alignment with the spindle motor is sinusoidal with a period equal to the rotation of the disk. This sinusoidal disturbance can be represented as:

$$a*\cos(2\pi k/N)+b*\sin(2\pi k/N)$$

where $\{a,b\}$ are coefficients corresponding to the magnitude of the disturbance (magnitude of the non-centric offset) and k is an index representing one of N servo sectors.

Prior art techniques typically estimate the composite RRO disturbance due to all sources of eccentricity, such as eccentricities of the servo sectors (written-in RRO), spindle motor runout, disk warping, as well as the RRO disturbance due to the disk's non-centric alignment with the spindle motor. The prior art techniques for estimating the composite RRO disturbance typically involves processing the position error signal (PES) over many revolutions of the disk in order to average out other noise sources (the non-repeatable runout). The composite RRO disturbance is typically estimated during a manufacturing process, and may be updated every time the disk drive is powered on to account for changes that occur over time, particularly from disk slippage due to external physical shocks. However, the numerous revolutions needed for estimating the composite RRO disturbance may result in undesirable response delays at power-on.

There is, therefore, a need for a fast, efficient technique for estimating the RRO disturbance in a disk drive that may be subjected to a physical shock causing disk slippage.

SUMMARY OF THE INVENTION

The present invention may be embodied in a method for determining fundamental-frequency repeatable runout (1FRRO) coefficients in a disk drive. The disk drive may include a transducer head, a rotating magnetic disk having a plurality of concentric data tracks defined by embedded servo wedges that provide position information, and an actuator coupled to the head. In the method, the head is caused to move in a substantially constant velocity motion across a selected portion of the tracks of the rotating magnetic disk in response to a control signal. The position information is read from the embedded servo wedges as the head moves across of the selected portion of the tracks. The 1FRRO coefficients are determined based on the position information read as the head moved in a substantially constant velocity motion across the selected portion of the tracks.

In more detailed features of the invention, the step of causing the head to move in a substantially constant velocity motion may occur as part of a ramp-load operation. The position information read from the embedded servo wedges may be track identification values. Also, the 1FRRO coefficients may be for computing first feed-forward compensation values for use in a head-position control servo loop. The first feed-forward compensation values 1FRRO coefficients may be computed using the 1FRRO coefficients $\{a,b\}$ of a sinusoid:

$$a*\cos(2\pi k/N)+b*\sin(2\pi k/N)$$

where k is an index representing one of N servo wedges.

In other more detailed features of the invention, the 1FRRO coefficients may comprise a first coefficient and a second coefficient. The 1FRRO coefficients $\{a,b\}$ may be determined based on the following equations:

$$\begin{bmatrix} a \\ b \end{bmatrix} = (M^T M)^{-1} \cdot M^T \cdot \bar{P};$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix};$$

$$C(i)=\cos(2*pi*W(i+1)/N)-\cos(2*pi*W(i)/N);$$

$$S(i)=\sin(2*pi*W(i+1)/N)-\sin(2*pi*W(i)/N);$$

where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i; and n is the total number of samples of the position information.

The present invention also may be embodied in a disk drive including a transducer head, a rotating magnetic disk having a plurality of concentric data tracks defined by embedded servo wedges that provide position information, an actuator coupled to the head, and a control system. The control system may be operable to generate a control signal for causing the head to move in a substantially constant velocity motion across a select portion of the tracks of the rotating magnetic disk, and to determine fundamental-frequency repeatable runout 1FRRO coefficients for the disk drive based on the position information read as the head moved in a substantially constant velocity motion across the selected portion of the tracks.

Another embodiment of the invention may reside in a method for determining repeatable runout (mFRRO) coefficients for a higher harmonic of a fundamental-frequency in a disk drive. In the method, the head is caused to move in a substantially constant velocity motion across a selected portion of the tracks of the rotating magnetic disk in response to a control signal. The position information is read from the embedded servo wedges as the head moves across of the selected portion of the tracks. The mFRRO coefficients are determined based on the position information read as the head moved in a substantially constant velocity motion across the selected portion of the tracks.

In more detailed features of the invention, the step of causing the head to move in a substantially constant velocity motion may occur as part of a ramp-load operation. The position information read from the embedded servo wedges may be track identification values. The mFRRO coefficients may be for computing first feed-forward compensation values for use in a head-position control servo loop. The first feed-forward compensation values mFRRO coefficients may be computed using the mFRRO coefficients $\{a,b\}$ of a sinusoid:

$$a*\cos(2\pi mk/N)+b*\sin(2\pi mk/N)$$

where k is an index representing one of N servo wedges, and m is the harmonic of the fundamental frequency.

The mFRRO coefficients may comprise a first coefficient and a second coefficient. The mFRRO coefficients $\{a,b\}$ may be determined based on the following equations:

$$\begin{bmatrix} a \\ b \end{bmatrix} = (M^T M)^{-1} \cdot M^T \cdot \bar{P};$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix};$$

$$C(i)=\cos(2*pi*m*W(i+1)/N)-\cos(2*pi*m*W(i)/N);$$

$$S(i)=\sin(2*pi*m*W(i+1)/N)-\sin(2*pi*m*W(i)/N);$$

where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i;

n is the total number of samples of the position information, and m is the harmonic of the fundamental frequency.

BRIEF DESCRIPTION OF THE DRAWINGS

The accompanying drawings illustrate embodiments of the present invention and, together with the description, serve to explain the principles of the invention.

DESCRIPTION OF THE PREFERRED EMBODIMENTS

Figure 1:
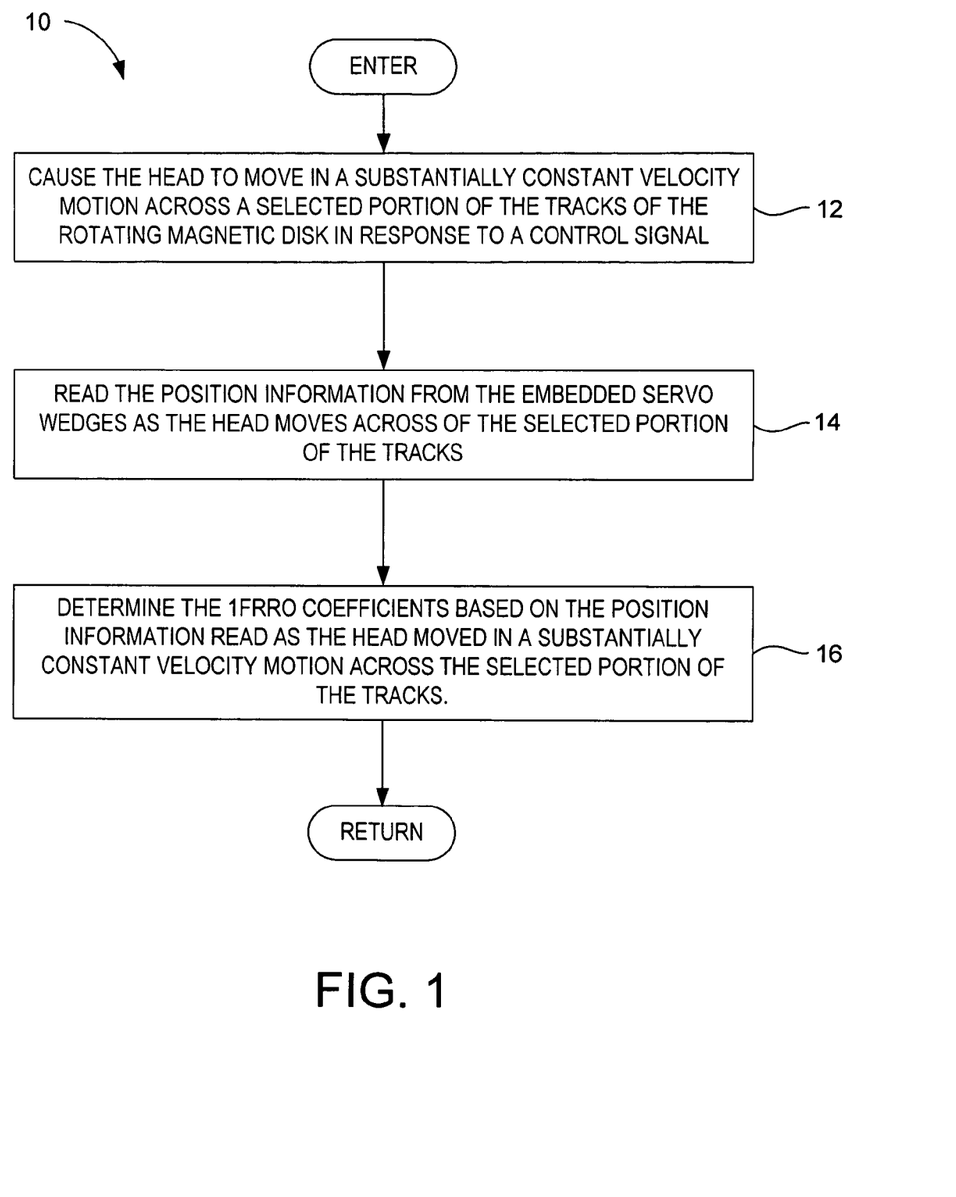
FIG. 1 is a flow diagram illustrating a method for efficiently determining fundamental-frequency repeatable runout (1FRRO) coefficients in a disk drive, according to the present invention.
Figure 2:
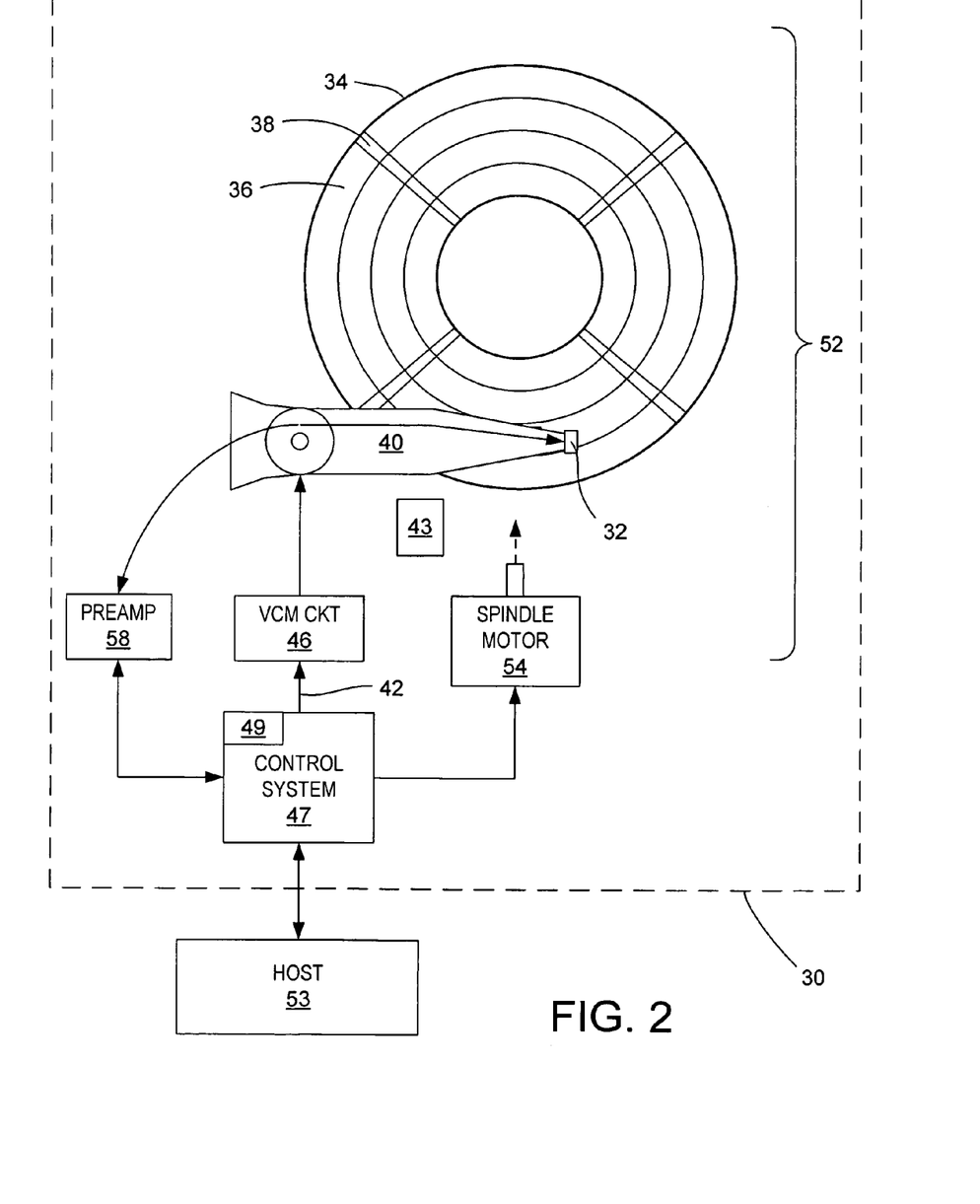
FIG. 2 is a block diagram of a computer system including a disk drive with a control system for implementing the determining methods, according to the present invention.

With reference to FIGS. 1 and 2, the present invention may be embodied in a method 10 (FIG. 1) for determining fundamental-frequency repeatable runout (1FRRO) coefficients in a disk drive 30 (FIG. 2). The disk drive may include a transducer head 32, a rotating magnetic disk 34 having a plurality of concentric data tracks 36 defined by embedded servo wedges 38 that provide position information, and an actuator 40 coupled to the head. In the method, the head is caused to move in a substantially constant velocity $V_C$ motion across a selected portion of the tracks of the rotating magnetic disk in response to a control signal 42 (step 12). The position information is read from the embedded servo wedges as the head moves across of the selected portion of the tracks (step 14). The 1FRRO coefficients are determined based on the position information read as the head moved in a substantially constant velocity motion across the selected portion of the tracks (step 16).

The step of causing the head 32 to move in a substantially constant velocity motion may occur as part of a ramp-load operation where the head is load over the disk surface from a parking ramp 43. Smaller form-factor disk drives may be used in mobile devices that may be subject to shock forces. The shock forces may cause a mechanical slip in the position between a disk hub and the disk. The slip may cause a large 1FRRO that acts as a disturbance in the disk drive's servo system. Integrating the constant velocity sweep as part of a ramp-load operation further saves time because the ramp-load operation is a necessary part of disk-drive initialization at power-on.

Figure 3:
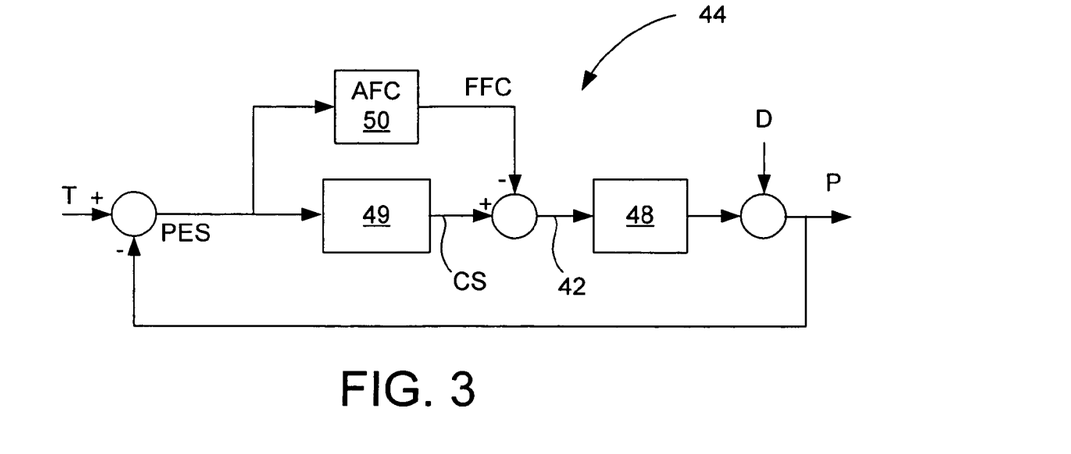
FIG. 3 is a block diagram of a servo control loop having adaptive feed-forward cancellation.

Adaptive feed-forward cancellation (AFC) may used to cancel repeatable runout (RRO) in a disk drive 30 as shown with reference to the servo control loop 44 in FIG. 3. The actuator 40 includes a voice coil motor (VCM) circuit 46 driven by the control signal 42. The assembly for the head position components is represented by block 48, a track-following compensator is represented by block 49, and the AFC is represented by block 50. The input to the track-following compensator 49 is a position error signal (PES) generated from a difference between a desired position signal T and a measured position signal P. The effect of the RRO disturbance D is cancelled at the input of the VCM by subtracting an feed-forward compensation value FFC, corresponding to the RRO disturbance, from a compensator signal CS. The feed-forward cancellation value can be computed using the formula:

$$FFC(k)=A(k-1)\cos(\omega Tk)+B(k-1)\sin(\omega Tk)$$

The coefficients A and B are related to the magnitude and phase of the 1FRRO disturbance. The coefficients are learned each time the disk drive was powered up using the following equations.

$$A(k)=A(k-1)+\lambda PES \cos(\omega Tk)$$

$$B(k)=B(k-1)+\lambda PES \sin(\omega Tk)$$

where $\lambda$ is a learning rate, which is set to a fast rate at power up and lowered to a slow rate during disk drive operation. However, prior to the present invention, the initial values of A and B were set to zero and the convergence rate of the coefficient learning could be as high as 30 disk revolutions.

This high number of disk revolutions often made it difficult to meet strict power-to-ready time specifications needed to provide an "instant-on" feel to mobile devices, which feel is also available in alternate competitive technologies such as flash memory. In the present invention, the 1FRRO coefficients may be used in computing first feed-forward compensation values for use in a head-position control servo loop. The first feed-forward compensation values 1FRRO coefficients may be computed using the 1FRRO coefficients {a,b} of a sinusoid:

$$a*\cos(2\pi k/N)+b*\sin(2\pi k/N)$$

where k is an index representing one of N servo wedges.

The 1FRRO coefficients {a,b} may be determined based on the following equations:

$$\begin{bmatrix} a \\ b \end{bmatrix} = (M^T M)^{-1} \cdot M^T \cdot \vec{P}.;$$

$$\vec{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix}.;$$

$$C(i)=\cos(2*pi*W(i+1)/N)-\cos(2*pi*W(i)/N);$$

$$S(i)=\sin(2*pi*W(i+1)/N)-\sin(2*pi*W(i)/N);$$

where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i; and n is the total number of samples of the position information.

The control system 47 of the disk drive 30 (FIG. 2) is operable to generate the control signal to perform the method steps set forth above and shown in FIG. 1. The control system includes the track-following compensator 49, and circuitry and processors that control a head-disk assembly (HDA) 52 and that provide an intelligent interface between a host 53 and the HDA for execution of read and write commands. The HDA includes the magnetic disk 34 having the plurality of concentric data tracks 36 recorded thereon. The control system may have an internal microprocessor and memory for implementing the techniques related to the invention. Program code for implementing these techniques may be stored in nonvolatile memory and transferred to volatile random access memory (RAM) for execution by the microprocessor. The microprocessor and the supporting hardware of the disk drive comprise the means for implementing the functions of the disk drive. The HDA further includes a spindle motor 56, the actuator 40, the voice coil motor (VCM) circuit 46 coupled between the actuator and a sampled servo controller of the control system (that implements the track-following compensator 48), and a preamplifier 58 coupled between the control system and the transducer head 32 on the actuator.

The magnetic media surface of the disk 34 is accessed using the head 32. The tracks 36 on the media surface may be divided into storage segments. Each storage segment typically begins with a servo sector which is followed by data sectors. The servo sector for a storage segment corresponds to an intersection with the radially-extending embedded servo wedges 38. Each servo sector includes a track address for generating a coarse position for the head, and servo bursts for generating a fine position of the head with respect to the centerline of the target track. The data sectors may include data blocks, each generally storing 512 data bytes. Each data block may be addressed using a logical block address (LBA).

Figure 4:
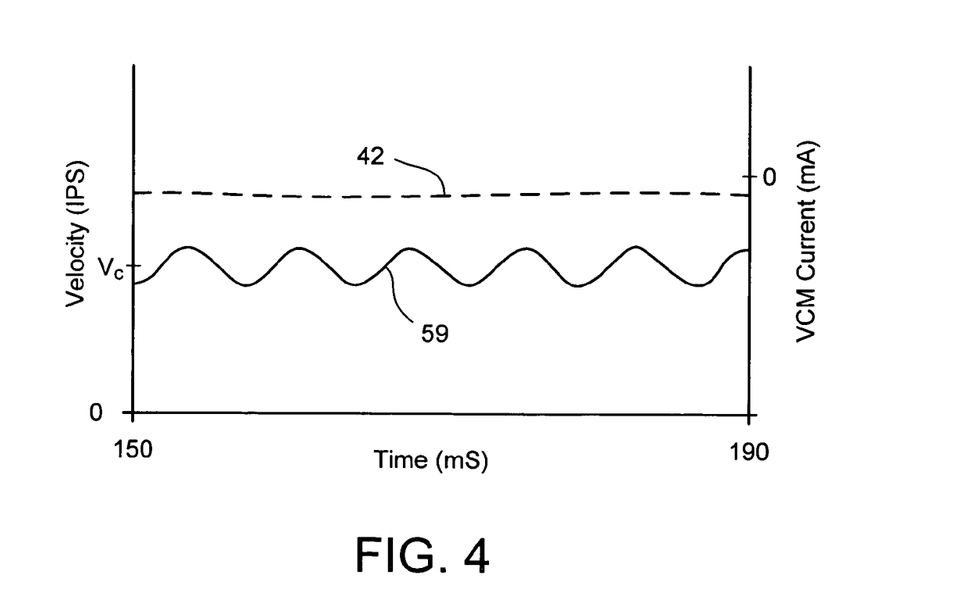
FIG. 4 is a graph of a measured head velocity, and VCM current, verses time, during a constant velocity motion across disk tracks as part of a ramp load operation, according to the present invention.

With reference to FIG. 4, during the ramp load operation, the head 32 sweeps across a selected portion of the tracks 36 at a substantially constant velocity $V_C$ in response to the control signal 42 applied to the VCM circuit 46. However, the fundamental-frequency RRO causes the measured velocity 59 to oscillate about the constant velocity value. The magnitude and phase of the measured velocity is related to the amount of disk slippage or other physical imperfections from a perfect center.

Although not shown in FIG. 4, the velocity of the head 32 may slow as the head traverses the selected portion of the tracks 36. As long as the measured velocity oscillations are discernable with respect to such slowing, the slight velocity reduction should not alter the accelerated RRO coefficient determination. Thus, slight velocity changes are within the meaning of substantially constant velocity.

Figure 6:
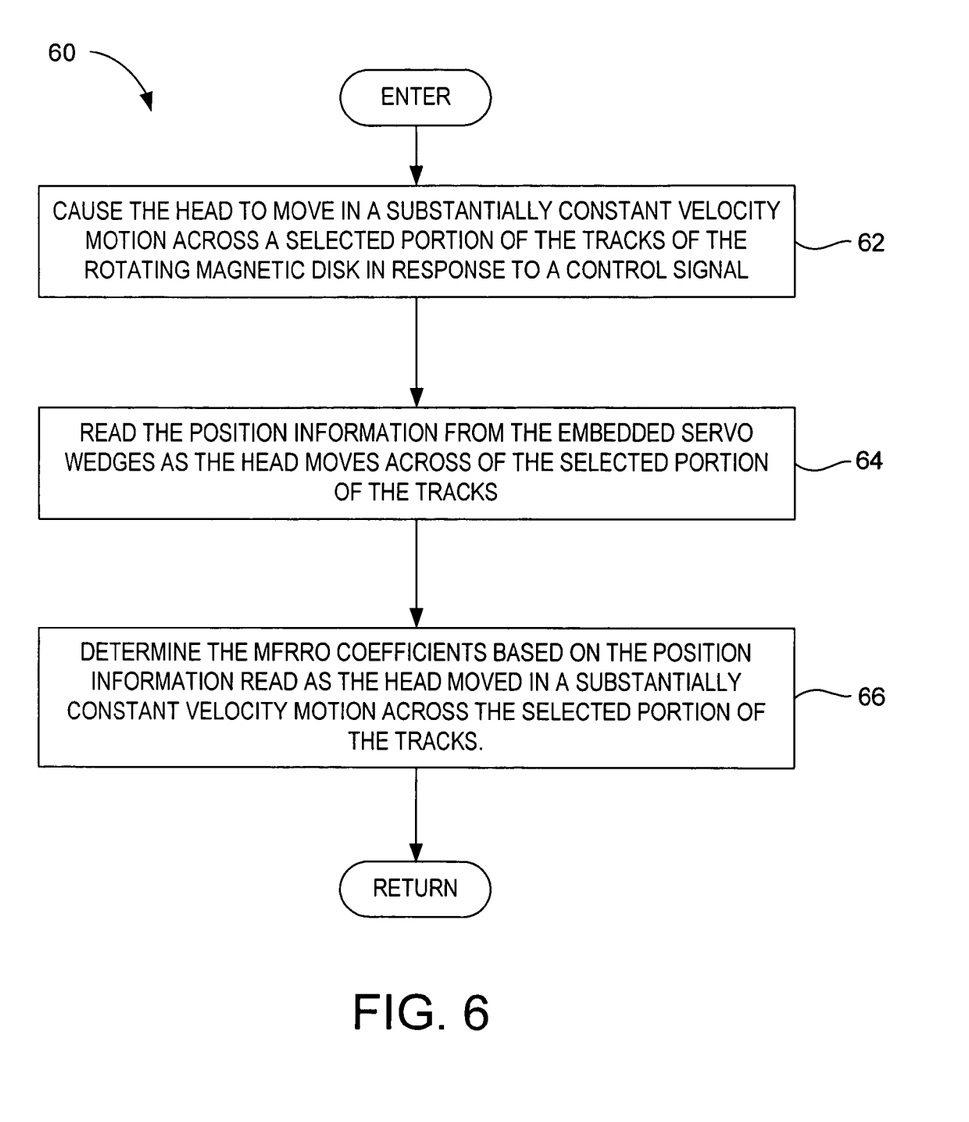
FIG. 6 is a flow diagram illustrating a method for efficiently determining repeatable runout coefficients for a higher harmonic of a fundamental-frequency (mFRRO) in a disk drive, according to the present invention.

With reference to FIG. 6, another embodiment of the invention may reside in a method 60 for determining repeatable runout (mFRRO) coefficients for a higher harmonic of a fundamental-frequency in the disk drive 30. In the method, the head 32 is caused to move in a substantially constant velocity motion across a selected portion of the tracks 36 of the rotating magnetic disk 34 in response to a control signal 42 (step 62). The position information is read from the embedded servo wedges 38 as the head moves across of the selected portion of the tracks (step 64). The mFRRO coefficients are determined based on the position information read as the head moved in a substantially constant velocity motion across the selected portion of the tracks (step 66).

The mFRRO coefficients may be for computing first feed-forward compensation values for use in a head-position control servo loop 44. The first feed-forward compensation values mFRRO coefficients may be computed using the mFRRO coefficients {a,b} of a sinusoid:

$$a*\cos(2\pi mk/N)+b*\sin(2\pi mk/N)$$

where k is an index representing one of N servo wedges, and m is the harmonic of the fundamental frequency.

The mFRRO coefficients may comprise a first coefficient and a second coefficient. The mFRRO coefficients {a,b} may be determined based on the following equations:

$$\begin{bmatrix} a \\ b \end{bmatrix} = (M^T M)^{-1} \cdot M^T \cdot \bar{P}.;$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix}.;$$

$$C(i)=\cos(2*pi*m*W(i+1)/N)-\cos(2*pi*m*W(i)/N);$$

$$S(i)=\sin(2*pi*m*W(i+1)/N)-\sin(2*pi*m*W(i)/N);$$

where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i;

n is the total number of samples of the position information, and m is the harmonic of the fundamental frequency.

A gain factor may need to be applied between the estimated a and b coefficients and the learned A and B coefficients. The gain factor may be calibrated and stored during manufacturing by learning calculating the coefficients A and B during manufacture. The a and b coefficients are estimated, and the gain factor calculated:

$$\text{Gain}=(a^2+b^2)^{1/2}./(A^2+B^2)^{1/2}$$

After power up and estimation the a and b 1FRRO coefficients, the initial coefficients A and B may be calculated by the following equations:

$$A=-a/\text{Gain}$$

$$B=-b/\text{Gain}$$

Figure 5:
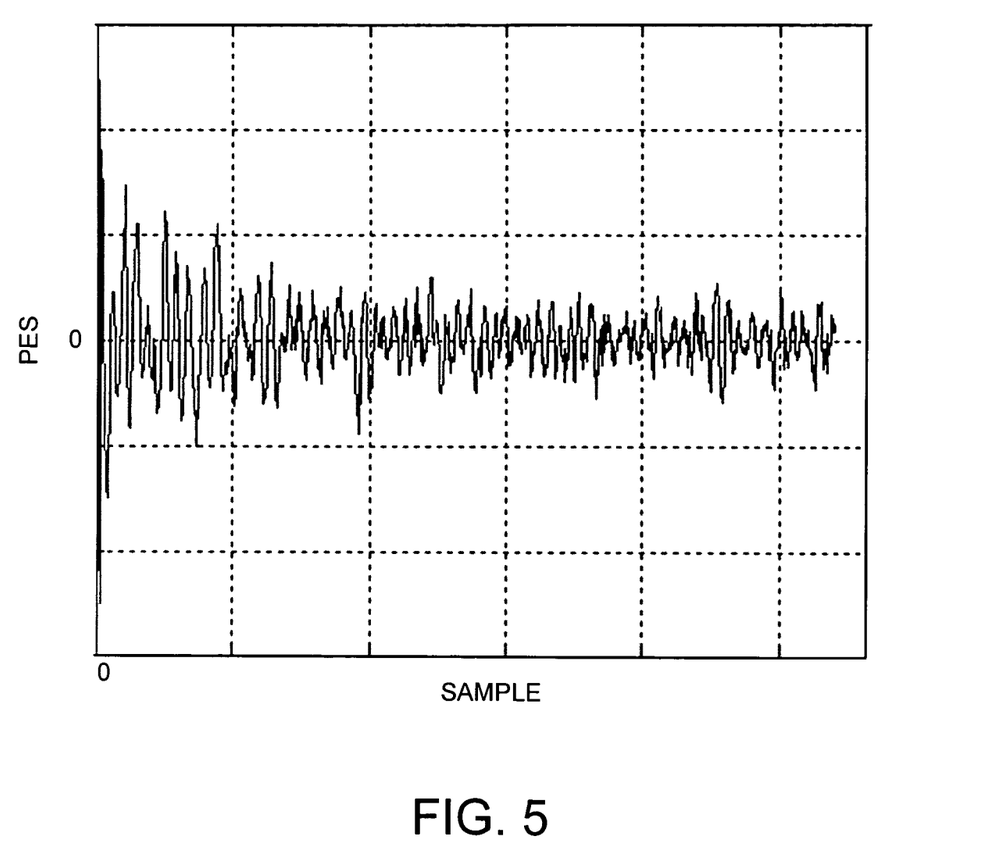
FIG. 5 is a graph of a position error signal (PES) verses servo sample showing convergence using the adaptive feed-forward cancellation technique.

The resulting A and B values are used as the initial values of the AFC, and a much faster learning rate may be achieved as indicated in FIG. 5. The AFC takes about 2 disk revolutions to reach convergence as shown by the decreasing, and then steady, variance in the PES.

We claim:

1. A method for determining fundamental-frequency repeatable runout (1FRRO) coefficients in a disk drive including a transducer head, a rotating magnetic disk having a plurality of concentric data tracks defined by embedded servo wedges that provide position information, and an actuator coupled to the head, the method comprising:

causing the head to move in a substantially constant velocity motion across a selected portion of the tracks of the rotating magnetic disk in response to a control signal;

reading the position information from the embedded servo wedges as the head moves across of the selected portion of the tracks; and determining the 1FRRO coefficients based on the position information read as the head moved in a substantially constant velocity motion across the selected portion of the tracks.

2. A method for determining 1FRRO coefficients in a disk drive as defined in claim 1, wherein the step of causing the head to move in a substantially constant velocity motion occurs as part of a ramp-load operation.

3. A method for determining 1FRRO coefficients in a disk drive as defined in claim 1, wherein the 1FRRO coefficients comprise a first coefficient and a second coefficient.

4. A method for determining 1FRRO coefficients in a disk drive as defined in claim 1, wherein the 1FRRO coefficients are for computing first feed-forward compensation values for use in a head-position control servo loop.

5. A method for determining 1FRRO coefficients in a disk drive as defined in claim 4, wherein the first feed-forward compensation values 1FRRO coefficients are computed using the 1FRRO coefficients {a,b} of a sinusoid:

$$a*\cos(2\pi k/N)+b*\sin(2\pi k/N)$$

where k is an index representing one of N servo wedges.

6. A method for determining 1FRRO coefficients in a disk drive as defined in claim 1, wherein the position information read from the embedded servo wedges is track identification values.

7. A method for determining 1FRRO coefficients in a disk drive as defined in claim 1, wherein the 1FRRO coefficients {a,b} are determined based on the following equations:

$$\begin{bmatrix} a \\ b \end{bmatrix} = (M^T M)^{-1} \cdot M^T \cdot \bar{P}.;$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix}.;$$

$$C(i)=\cos(2*pi*W(i+1)/N)-\cos(2*pi*W(i)/N);$$

$$S(i)=\sin(2*pi*W(i+1)/N)-\sin(2*pi*W(i)/N);$$

where:
- v is an average velocity determined by an average number of tracks per sample;
- i is the i-th sample of the position information read during the constant motion;
- TK(i) is the track id reading at i-th sample;
- N is the total number of servo wedges;
- W(i) is a servo wedge number at sample i; and
- n is the total number of samples of the position information.

8. A disk drive, comprising:
a transducer head;
a rotating magnetic disk having a plurality of concentric data tracks defined by embedded servo wedges that provide position information;
an actuator coupled to the head; and
a control system operable to:
  generate a control signal for causing the head to move in a substantially constant velocity motion across a select portion of the tracks of the rotating magnetic disk, and
  determine fundamental-frequency repeatable runout 1FRRO coefficients for the disk drive based on the position information read as the head moved in a substantially constant velocity motion across the selected portion of the tracks.

9. A disk drive as defined in claim 8, wherein causing the head to move in a substantially constant velocity motion occurs as part of a ramp-load operation.

10. A disk drive as defined in claim 8, wherein the 1FRRO coefficients comprise a first coefficient and a second coefficient.

11. A disk drive as defined in claim 8, wherein the 1FRRO coefficients are for computing first feed-forward compensation values for use in a head-position control servo loop.

12. A disk drive as defined in claim 11, wherein the first feed-forward compensation values 1FRRO coefficients are computed using the 1FRRO coefficients $\{a,b\}$ of a sinusoid:

$$a*\cos(2\pi k/N)+b*\sin(2\pi k/N)$$

where k is an index representing one of N servo wedges.

13. A disk drive as defined in claim 8, wherein the position information read from the embedded servo wedges are track identification values.

14. A disk drive as defined in claim 8, wherein the 1FRRO coefficients $\{a,b\}$ are determined based on the following equations:

$$\begin{bmatrix} a \\ b \end{bmatrix} = (M^T M)^{-1} \cdot M^T \cdot \bar{P};$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix};$$

$$C(i)=\cos(2*pi*W(i+1)/N)-\cos(2*pi*W(i)/N);$$

$$S(i)=\sin(2*pi*W(i+1)/N)-\sin(2*pi*W(i)/N);$$

where:
- v is an average velocity determined by an average number of tracks per sample;
- i is the i-th sample of the position information read during the constant motion;
- TK(i) is the track id reading at i-th sample;
- N is the total number of servo wedges;
- W(i) is a servo wedge number at sample i; and
- n is the total number of samples of the position information.

15. A method for determining repeatable runout (mFRRO) coefficients for a higher harmonic of a fundamental-frequency in a disk drive including a transducer head, a rotating magnetic disk having a plurality of concentric data tracks defined by embedded servo wedges that provide position information, and an actuator coupled to the head, the method comprising:
  causing the head to move in a substantially constant velocity motion across a selected portion of the tracks of the rotating magnetic disk in response to a control signal;
  reading the position information from the embedded servo wedges as the head moves across of the selected portion of the tracks; and
  determining the mFRRO coefficients based on the position information read as the head moved in a substantially constant velocity motion across the selected portion of the tracks.

16. A method for determining mFRRO coefficients in a disk drive as defined in claim 15, wherein the step of causing the head to move in a substantially constant velocity motion occurs as part of a ramp-load operation.

17. A method for determining mFRRO coefficients in a disk drive as defined in claim 15, wherein the mFRRO coefficients comprise a first coefficient and a second coefficient.

18. A method for determining mFRRO coefficients in a disk drive as defined in claim 15, wherein the mFRRO coefficients are for computing first feed-forward compensation values for use in a head-position control servo loop.

19. A method for determining mFRRO coefficients in a disk drive as defined in claim 18, wherein the first feed-forward compensation values mFRRO coefficients are computed using the mFRRO coefficients $\{a,b\}$ of a sinusoid:

$$a*\cos(2\pi mk/N)+b*\sin(2\pi mk/N)$$

where k is an index representing one of N servo wedges, and m is the harmonic of the fundamental frequency.

20. A method for determining mFRRO coefficients in a disk drive as defined in claim 15, wherein the position information read from the embedded servo wedges is track identification values.

21. A method for determining mFRRO coefficients in a disk drive as defined in claim 15, wherein the mFRRO coefficients $\{a,b\}$ are determined based on the following equations:

$$\begin{bmatrix} a \\ b \end{bmatrix} = (M^T M)^{-1} \cdot M^T \cdot \bar{P};$$

$$\bar{P}=[P(1), P(2), P(3), \ldots, P(n)]^T;$$

$$P(i)=TK(i+1)-TK(i)-v;$$

$$M = \begin{bmatrix} C(1) & S(1) \\ C(2) & S(2) \\ \ldots & \ldots \\ C(n) & S(n) \end{bmatrix};$$

$C(i)=\cos(2*pi*m*W(i+1)/N)-\cos(2*pi*m*W(i)/N);$ $S(i)=\sin(2*pi*m*W(i+1)/N)-\sin(2*pi*m*W(i)/N);$ where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i;

n is the total number of samples of the position information, and m is the harmonic of the fundamental frequency.

22. A disk drive, comprising:
a transducer head;
a rotating magnetic disk having a plurality of concentric data tracks defined by embedded servo wedges that provide position information;
an actuator coupled to the head; and
a control system operable to:
generate a control signal for causing the head to move in a substantially constant velocity motion across a select portion of the tracks of the rotating magnetic disk, and
determine repeatable runout mFRRO coefficients for a higher harmonic of a fundamental-frequency of the disk drive based on the position information read as the head moved in a substantially constant velocity motion across the selected portion of the tracks.

23. A disk drive as defined in claim 22, wherein causing the head to move in a substantially constant velocity motion occurs as part of a ramp-load operation.

24. A disk drive as defined in claim 22, wherein the mFRRO coefficients comprise a first coefficient and a second coefficient.

25. A disk drive as defined in claim 22, wherein the mFRRO coefficients are for computing first feed-forward compensation values for use in a head-position control servo loop.

26. A disk drive as defined in claim 25, wherein the first feed-forward compensation values mFRRO coefficients are computed using the mFRRO coefficients {a,b} of a sinusoid:

$a*\cos(2\pi mk/N)+b*\sin(2\pi mk/N)$ where k is an index representing one of N servo wedges, and m is the harmonic of the fundamental frequency.

27. A disk drive as defined in claim 22, wherein the position information read from the embedded servo wedges are track identification values.

28. A disk drive as defined in claim 22, wherein the mFRRO coefficients {a,b} are determined based on the following equations:

$$\begin{bmatrix} a \\ b \end{bmatrix} = (M^T M)^{-1} \cdot M^T \cdot \bar{P};$$

$\bar{P}=[P(1), P(2), P(3), \ldots, P(n)]^T;$ $P(i)=TK(i+1)-TK(i)-v;$ $$M = \begin{bmatrix} C(1) & S(1) \\ C(2) & S(2) \\ \ldots & \ldots \\ C(n) & S(n) \end{bmatrix};$$

$C(i)=\cos(2*pi*W(i+1)/N)-\cos(2*pi*W(i)/N);$ $S(i)=\sin(2*pi*W(i+1)/N)-\sin(2*pi*W(i)/N);$ where:

v is an average velocity determined by an average number of tracks per sample;

i is the i-th sample of the position information read during the constant motion;

TK(i) is the track id reading at i-th sample;

N is the total number of servo wedges;

W(i) is a servo wedge number at sample i; and n is the total number of samples of the position information, and m is the harmonic of the fundamental frequency.

* * * * *